N. W. SATTERLUND.
CYLINDER HARROW.
APPLICATION FILED OCT. 25, 1909.
966,128.
Patented Aug. 2, 1910.
2 SHEETS—SHEET 1.
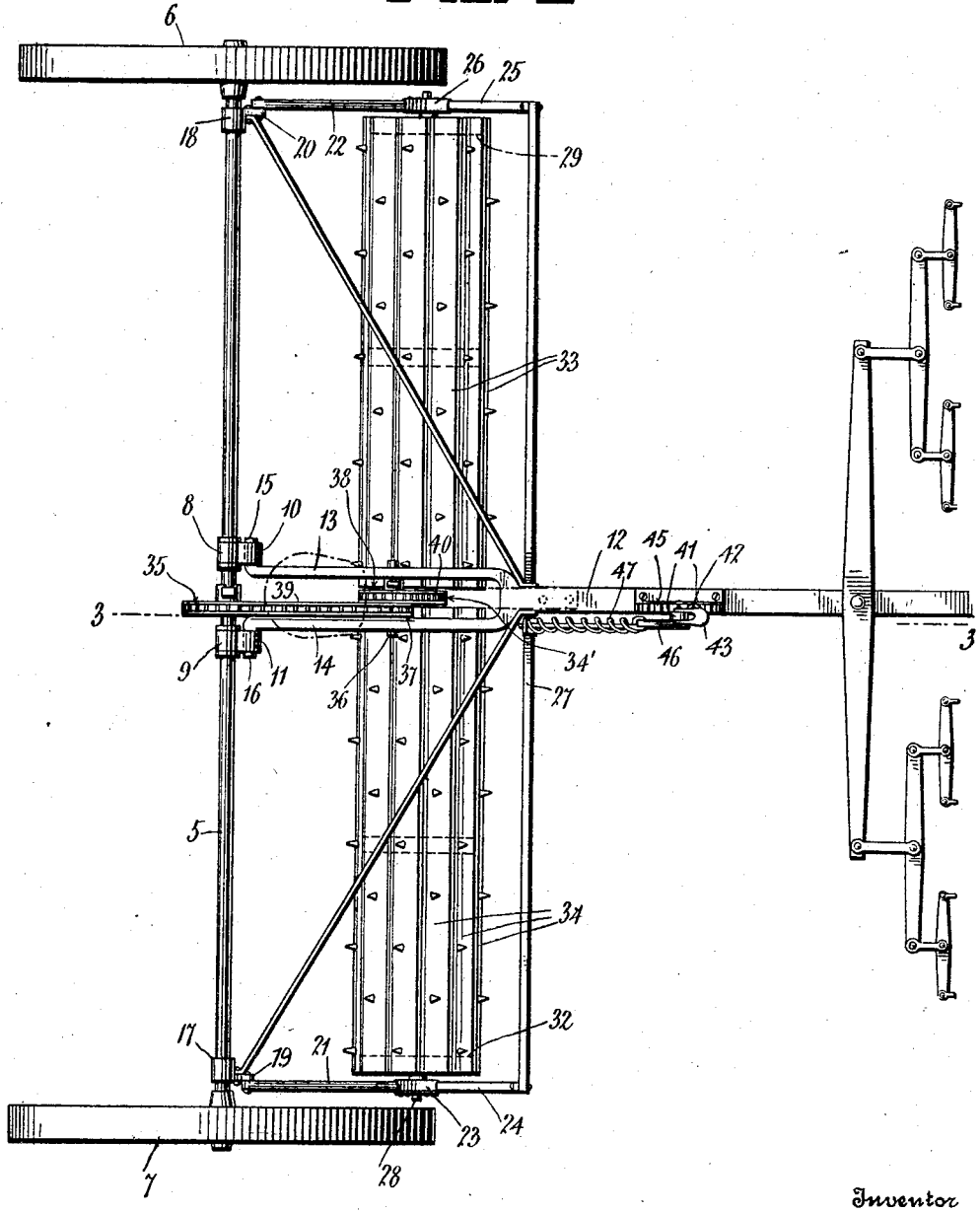
Witnesses
Inventor
Nels W. Satterlund
By
Attorneys N. W. SATTERLUND.
CYLINDER HARROW.
APPLICATION FILED OCT. 25, 1909.
966,128.
Patented Aug. 2, 1910.
2 SHEETS—SHEET 2.
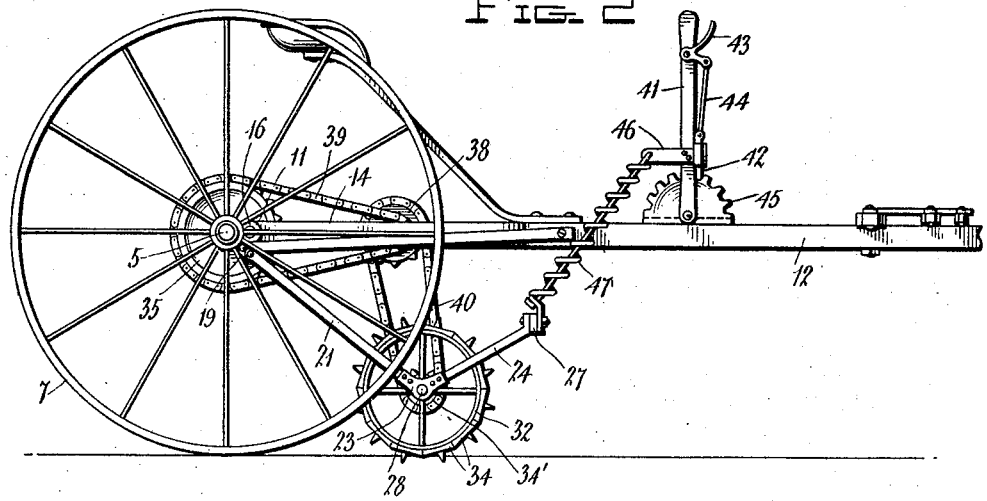
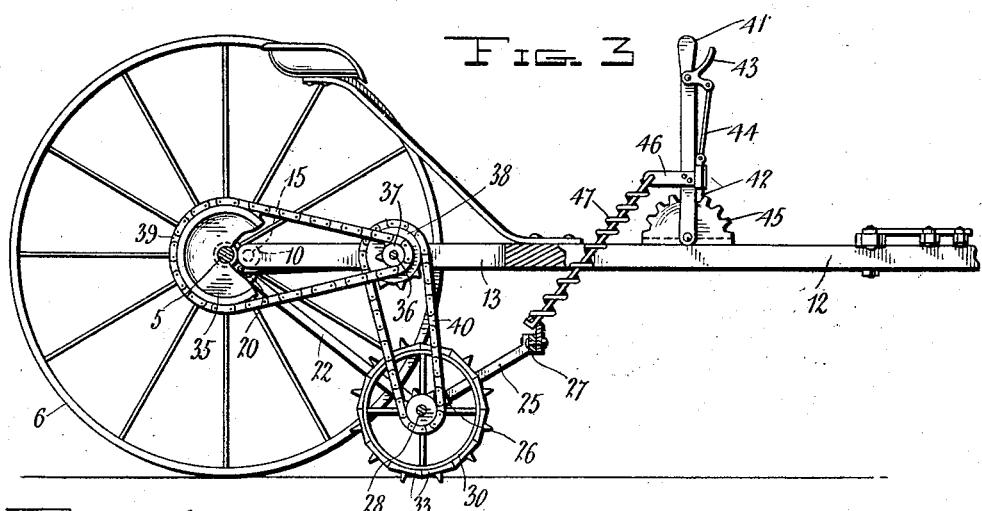
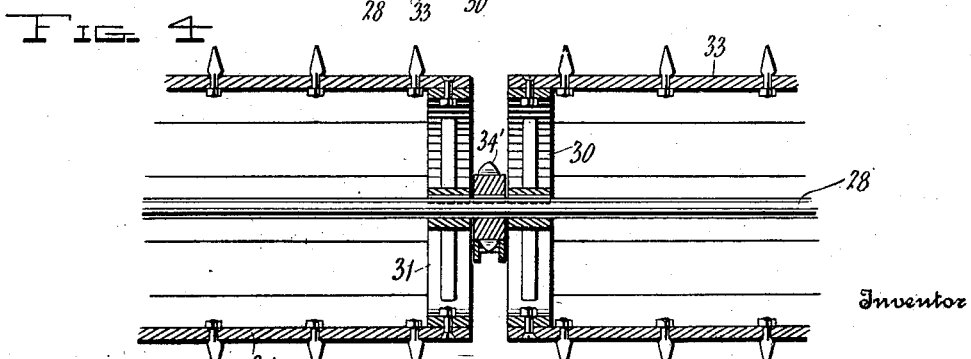
Witnesses
Inventor
Nels W. Satterlund
By
Attorneys

UNITED STATES PATENT OFFICE.

NELS W. SATTERLUND, OF CARPIO, NORTH DAKOTA.

CYLINDER-HARROW.

966,128.　　　　Specification of Letters Patent.　　Patented Aug. 2, 1910.

Application filed October 25, 1909. Serial No. 524,540.

*To all whom it may concern:*

Be it known that I, NELS W. SATTERLUND, a citizen of the United States, residing at Carpio, in the county of Ward, State of North Dakota, have invented certain new and useful Improvements in Cylinder-Harrows; and I do hereby declare the following to be a full, clear, and exact description of the invention, such as will enable others skilled in the art to which it appertains to make and use the same.

This invention relates to farming implements, and particularly to those of the cylinder harrow type.

The object of the invention is to provide an implement of the type named provided with a rotary clod crushing element, which is actuated at a greater rate of speed than would be imparted to same by engagement with the soil during travel.

To this end the invention consists in journaling a rotary clod crushing element on a pivoted frame and of supplying a series of connections between the shaft which carries the element and main axle of the implement in such manner that the speed of rotation of the clod crushing element will be considerably in excess of the rotation of the main axle.

A further object of the invention is to provide a farming implement of the character named which will be exceedingly efficient in use, simple in construction and comparatively inexpensive to produce.

With the above and other objects in view the invention consists in the details of construction and in the arrangement and combination of parts to be herein more fully described and claimed.

In describing the invention in detail reference will be had to the accompanying drawings in which like characters of reference denote corresponding parts in the several views, and in which, Figure 1 is a top plan view of the invention; Fig. 2, a side elevation thereof; Fig. 3, a section on the line 3—3 of Fig. 1, and Fig. 4, a fragmental longitudinal section of a portion of the harrow element.

Referring to the drawings, 5 indicates the main axle of the device which is supported by the traction wheels 6 and 7 fixed to each end thereof. Mounted centrally of the axle 5 so as to be capable of independent rotation with respect to said axle and restrained against longitudinal movement thereof are the sleeves 8 and 9. Said sleeves 8 and 9 are provided with the lugs 10 and 11 respectively which have corresponding transverse apertures therethrough for a purpose to be presently described. A draft tongue 12 has its rear end bifurcated to form the arms 13 and 14 which in turn have their free ends bent outwardly in opposite directions to form the arms 15 and 16 respectively which are inserted through the apertures in the lugs 10 and 11 to secure the tongue to the axle 5. The sleeves 17 and 18, provided with lugs 19 and 20 respectively are mounted for rotation at each end of the shaft 5. Pivoted to the lug 19 is an arm 21 while a corresponding arm 22 is pivoted to the lug 20. Coupled to the arm 21 by an angle coupling 23 is an arm 24 and a similar arm 25 is secured to the arm 22 by the angle coupling 26. The free ends of the arms 24 and 25 are connected together by a cross bar 27; the said bar 27 together with the arms 21 and 24 and the arms 22 and 25 constituting the pivoted frame which carries the rotary harrow element.

Having its ends journaled in the angle coupling 23 and 26 is a shaft 28. Mounted on said shaft are the spaced annular frames 29, 30, 31 and 32 which are arranged in pairs and connected together by the toothed bars 33 and 34 respectively to constitute the harrow elements of the device. The harrow elements thus formed are spaced away from each other and a sprocket wheel 34 is mounted on the shaft 28 therebetween for rotation with said shaft.

Mounted on the axle 5 for rotation therewith is a sprocket wheel 35. Journaled between the arms 13 and 14 of the tongue 12 is a shaft 36 and mounted on the shaft for rotation therewith are the sprocket wheels 37 and 38; the sprocket wheel 37 being of less diameter than the sprocket wheel 35 on the axle and the sprocket wheel 38 being of greater diameter than the sprocket wheel 37 and the sprocket wheel 34. A sprocket chain 39 operatively connects the sprocket wheels 35 and 37 while another sprocket chain 40 connects the sprocket wheels 38 and 34.

From the construction previously described it will be obvious that during the movements of the implement on the wheels 6 and 7 the axle 5 and in turn the sprocket wheel 35 mounted thereon will be rotated. This rotation of the sprocket wheel 35 through the medium of the sprocket chain 39 will rotate the sprocket wheel 37 which in turn will rotate the shaft 36 and the sprocket wheel 38 and thus impart a rotation to the harrow elements of the device by reason of the connection 40 between the sprocket wheel 38 and the sprocket wheel 34. It will also be noted that inasmuch as the sprocket wheel 35 has a greater diameter than the sprocket wheel 37 and also that the sprocket wheel 38 has a greater diameter than either the sprocket wheel 37 or the sprocket wheel 34 the speed of rotation imparted to the harrow element will be considerably in excess of the speed of rotation of the axle 5.

Pivotally mounted upon the tongue 12 is an operating lever 41 which carries a spring actuated pawl 42 operated through the medium of the grip 43 and the connection 44. Disposed upon said tongue and adapted for engagement by the pawl 42 is a toothed segment 45. Secured to the lever 41 is an arm 46 and a suitable connection 47 has one end fastened to said arm and the other end fastened to the cross bar 27 of the frame which supports the harrow elements. By the construction just described it will be apparent that the movement of the lever 41 on its pivot will through the medium of the connection 47 impart a similar movement to the harrow element and its supporting frame, whereby an adjustment of said frame and harrow element may be effected when desired; the engagement of the pawl 42 with the teeth of the segment 45 serving to lock the frame and harrow element in any desired adjustment.

What is claimed is:—

In a farming implement, the combination with a wheel supported axle, of a draft tongue provided with a forked end and operatively connected to the axle, a frame pivoted to said axle, a shaft journaled in said frame, a toothed cylinder mounted on said shaft, a sprocket wheel mounted on said axle, a shaft journaled in said tongue between the arms of the fork thereof, a sprocket wheel mounted on said shaft, a sprocket chain connecting the wheel of the axle and said last named wheel; a second sprocket wheel mounted on the shaft journaled in the tongue, a sprocket wheel mounted on the shaft journaled in the frame and a sprocket chain connecting the two last named sprocket wheels.

In testimony whereof, I affix my signature, in presence of two witnesses.

NELS W. SATTERLUND.

Witnesses:
 OSCAR HERUM,
 S. J. RASMUCEN.